United States Patent [19]

Bostrom et al.

[11] Patent Number: 5,213,392
[45] Date of Patent: May 25, 1993

[54] SEAT CONSTRUCTION

[76] Inventors: John M. Bostrom, 6609 Riverside Rd., Waterford, Wis. 53185; Kurt H. Bostrom, W296 N2241 Glen Clove Rd., Pewaukee, Wis. 53072

[21] Appl. No.: 724,598

[22] Filed: Jul. 2, 1991

[51] Int. Cl.⁵ ............................................. A47C 7/62
[52] U.S. Cl. .................. 297/217; 297/191; 297/404; 297/403
[58] Field of Search ............... 297/191, 396, 217, 403, 297/404, 408, 391, 460

[56] References Cited

U.S. PATENT DOCUMENTS

| | | | |
|---|---|---|---|
| 3,304,120 | 2/1967 | Cramer | 297/403 |
| 3,971,591 | 7/1976 | Fiaylek | 297/191 |
| 4,537,444 | 8/1985 | Maruyama et al. | 297/460 |
| 4,681,366 | 7/1987 | Lobanoff | 297/191 |
| 4,697,848 | 10/1987 | Hattou et al. | 297/460 |
| 4,793,652 | 12/1988 | Hannah et al. | 297/460 X |

FOREIGN PATENT DOCUMENTS

| | | | |
|---|---|---|---|
| 2750103 | 5/1979 | Fed. Rep. of Germany | 297/408 |
| 3029150 | 3/1981 | Fed. Rep. of Germany | 297/408 |
| 3229857 | 2/1984 | Fed. Rep. of Germany | 297/460 |

OTHER PUBLICATIONS

Seats Incorporated, "Introducing the New SCBA 911 Fire Apparatus Seat".
Superior Equipment Co., "First In" SCBA Seat.

*Primary Examiner*—Peter R. Brown
*Attorney, Agent, or Firm*—Andrus, Sceales, Starke & Sawall

[57] ABSTRACT

A seat construction having a back composed of a pair of side pads which are spaced apart to provide a cavity therebetween. The cavity is adapted to receive a cylinder for a self-contained breathing apparatus which is strapped on the back of a fire fighter who is seated on the seat. The rear of the cavity is enclosed by a generally U-shaped closure and a head pad connects the upper ends of the side pads and can be pivoted from a head supporting position to a release position. As the fire fighter rises from the set, the cylinder which is strapped to his back will engage the head pad, pivoting it to a release position, so that the cylinder will not catch on the head pad as the fire fighter rises from the seat.

17 Claims, 2 Drawing Sheets

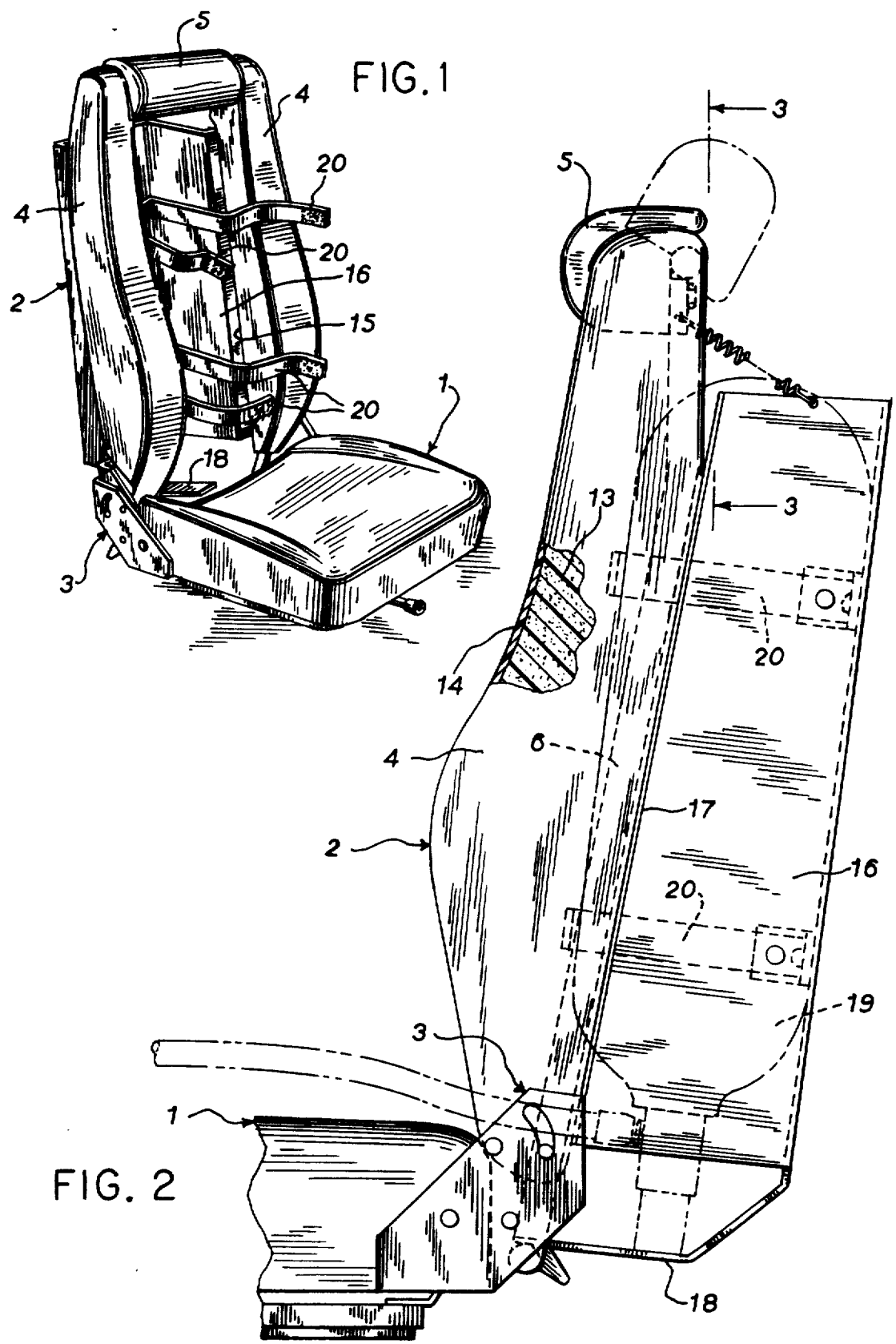

SEAT CONSTRUCTION

BACKGROUND OF THE INVENTION

Fire fighters are provided with self-contained breathing apparatus (SCBA), which includes an air cylinder that is strapped to the fire fighter's back when the fire fighter enters a burning or hazardous area. The SCBA is normally stored in the fire truck and, in some cases, the truck is provided with a post, column, or bracket and several SCBA are clamped to the post. With this arrangement, the fire fighter at the scene of the fire, must then unclamp the cylinder, remove the SCBA from this mounting device and then strap the SCBA to his body. This procedure can require a number of seconds which can be critical when dealing with the fire. In other cases, the backs of the seats in the fire truck are manufactured formed with elongated central cavities and the air cylinders of the SCBA are clamped, or otherwise secured in the cavities for storage.

The recent trend has been for the fire fighter to strap the SCBA to his body while the fire fighter is seated on the seat in the fire truck, with the SCBA stored in the cavity in the seat back. With this arrangement, precious seconds can be saved, due to the fact that the fire fighter does not have to remove the SCBA and strap the SCBA to his body at the scene of the fire.

Recently, the SCBA cylinders have been made from lightweight composite material and as a result of the weight reduction, the cylinders are constructed with a larger volume or size. Because of this, it has been found that when the fire fighter rises from the seat, with the SCBA strapped to his back, the top of the cylinder can catch on the head pad of the seat. By code or regulation, the seat must include a head pad to support the neck and head of the occupant, and the head pad must be located a specified distance above the seat base. Thus, the presence of the head pad can prevent the fire fighter from rising from the seat in the normal manner and the fire fighter must exert a conscious and somewhat awkward effort to move forwardly on the seat before rising.

SUMMARY OF THE INVENTION

The invention is directed to an improved seat construction that has particular application for use in a fire truck or other emergency vehicle. The seat includes a back which is composed of a pair of side pads spaced apart to provide a cavity or opening therebetween. The cavity is adapted to receive and store a SCBA, to be available immediately to be strapped to a fire fighter, or other seat occupant who is seated on the seat.

The rear of the cavity in the seat back is enclosed by a generally U-shaped closure and connecting the upper ends of the side pads is a head pad, which is mounted for pivoting movement from a head supporting position to a rear release position. As a fire fighter, having a SCBA strapped to the back, rises from the seat, the upper end of the cylinder will engage the undersurface of the head pad, pivoting the head pad to the release position to enable the cylinder to be removed from the cavity without catching or hanging up on the head pad.

The head pad is spring biased to the head supporting position, and after removal of the SCBA from the cavity, the head pad will be returned to its body supporting position under the influence of the biasing spring.

In situations where the SCBA is not strapped to the fire fighter, the cylinder can be stored in the cavity and secured to the rear enclosure by straps or clips.

With the seat construction of the invention, the head pad is automatically pivoted to a released or non-obstructing position by engagement with the cylinder as the fire fighter rises from the seat. After the fire fighter is unseated, the head pad will be automatically returned to its head supporting position.

The invention provides a simple and inexpensive construction for pivoting the head pad, in which the upper portion of the U-shaped frame for the seat back is utilized for a means for journalling the head pad for pivoting action.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the seat construction of the invention;

FIG. 2 is a fragmentary side elevation of the seat;

DESCRIPTION OF THE ILLUSTRATED EMBODIMENT

Figure 3:
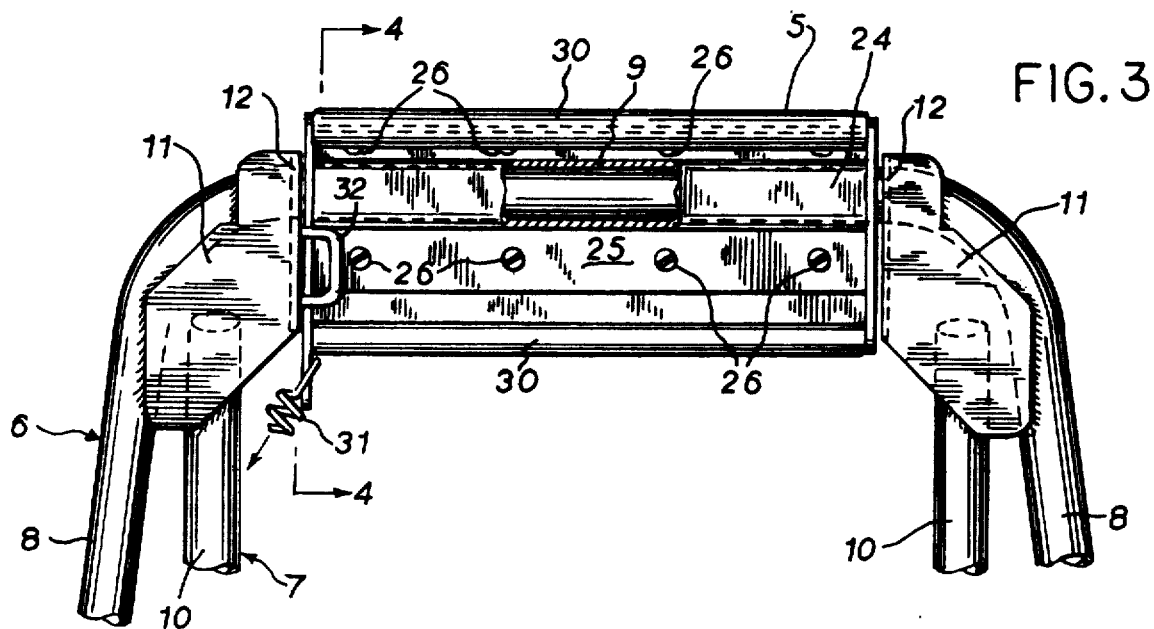
FIG. 3 is a fragmentary rear elevation of the back of the seat.

The drawings illustrate a seat which has particular application for use in a fire truck. The seat includes a base 1 and a back 2 extends upwardly from the rear of base 1. Back 2 can either be fixed to base 1, or can be mounted for tilting or pivoting movement relative to the base. As illustrated, the back is a tilting type and is connected to the base 1 via a conventional tilting mechanism indicated generally by 3. By manual release of the tilt mechanism, the back can be tilted in a fore-and-aft direction relative to base 1. The tilting mechanism is standard and in itself forms no part of the present invention.

Back 2 is composed of a pair of elongated side members or pads 4, the upper ends of which are connected by a head pad 5.

Back 2 includes an inverted U-shaped outer frame 6 and a U-shaped inner frame 7. Outer frame 6 is formed with a pair of generally vertical legs 8, the upper ends of which are connected by a horizontal section 9. Similarly, frame 7 includes a pair of vertical legs 10, which are located inwardly of legs 8, and the lower ends of legs 10 are connected together by a horizontal section, not shown. The upper ends of legs 10 are connected to the corresponding legs 8 by brackets 11, and each bracket 11 is provided with a flange 12 having an opening to receive the horizontal section 9 of outer frame 6.

Side pads 4 of back 2 also include a foam cushion 13, which is located outwardly of the frames 6 and 7, and a plastic or fabric covering 14 is secured around the cushion 13.

As best illustrated in FIG. 1, the space between side pads 4 defines an elongated cavity or opening 15, and the rear of the cavity is enclosed by a sheet metal closure 16, which is generally U-shaped in horizontal cross section. The side edges of closure 16 are provided with flanges 17, which are secured to the frames 6 and 7.

Both the top and bottom ends of the closure 16 are open and a lip 18 is connected to the lower end of the closure and extends inwardly below the open bottom end of the closure to provide a support for an air cylinder 19 of a self-contained breathing apparatus, SCBA, which is located within cavity 15.

In cases where the seat is unoccupied, cylinder 19 can be stored in cavity 15 and is retained in the cavity by straps 20, which are connected to the side edges of enclosure 16. Straps 20 can be provided with fasteners, preferably in the form of hook and loop fasteners as sold under the Velcro and other tradenames, which provide a convenient manner of connecting the straps in clamping relation around cylinder 19.

Figure 4:
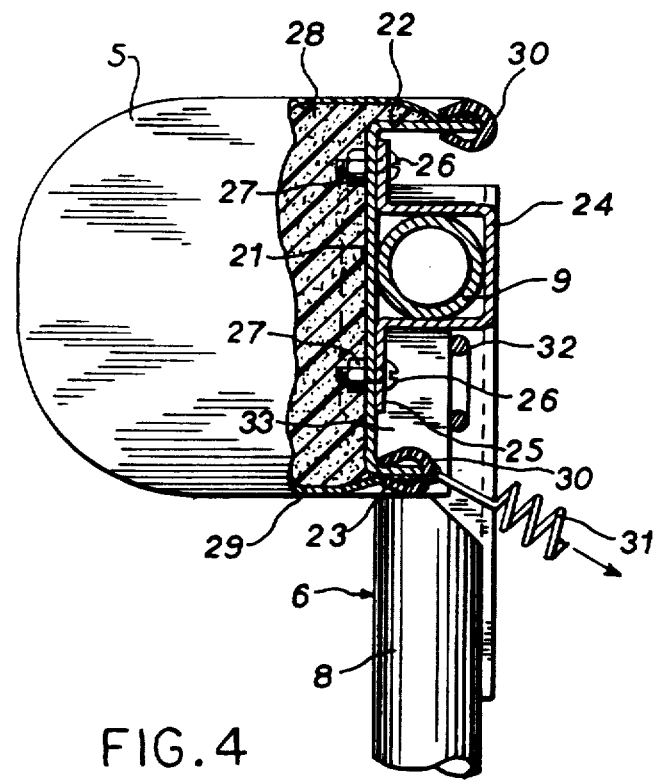
FIG. 4 is a section taken along line 4—4 of FIG. 3.

In other situations, where the SCBA 19 is strapped on the back of a fire fighter, the SCBA will be received in cavity 15 as the fire fighter sits on the base 1. To prevent the cylinder 19 from catching or hanging up on head pad 5, as the fire fighter rises from seat base 1, the head pad is mounted for pivoting movement from a head supporting position, as shown by the full lines in FIG. 2, to a release or non-obstructing position, shown by the dashed lines in FIG. 2. To provide this movement, head pad 5 includes a generally vertical backing plate 21 having a rearwardly extending upper flange 22, and a rearwardly extending lower flange 23. A bracket 24 is secured to the upper end of plate 21, as shown in FIG. 4. The upper and lower ends of bracket 24 are provided with vertical flanges 25, which are secured to the central portion of plate 21 by a series of bolts 26 that are engaged with nuts 27 welded or otherwise secured to the front surface of plate 21. The center formed section of bracket 24 encloses the tubular upper section 9 of frame 6 and provides a journalling mechanism for permitting the head pad to pivot or rotate about the axis of section 9.

Head pad 5 also includes a cushion 28, formed of foam plastic material, which is mounted to the forward face of plate 21 and the cushion 28 is enclosed by a fabric or plastic covering 29. The upper and lower edges of the covering 29 extend around the flanges 22 and 23 and are secured to the flanges by beads 30.

Head pad 5 is biased or urged to the head supporting position by an extension spring 31. One end of spring 31 is connected to the lower portion of plate 21 of head pad 5, while the opposite end of the spring is connected to the upper edge of enclosure 16. A stop 32 is secured to one of the brackets 116 and is positioned to be engaged by flange 33 of plate 21 of the head pad 5 to maintain the head pad in the head supporting position.

When a fire fighter having a SCBA 19 strapped to his back is seated on the seat base 1, the cylinder 19 will be received within the cavity 15. When the fire fighter rises from seat base 1, the upper end of cylinder 19 will contact the lower end of head pad 5, thereby pivoting the head pad from the head supporting position to the release position, where the cylinder can then move upwardly without restraint from the head pad. In practice, the head pad is mounted for pivotal movement through an arc of at least 90°, and preferably about 120°, as shown by the full and dashed lines in FIG. 2.

Once the fire fighter with the SCBA strapped on his back is unseated, the force of spring 31 will return the head pad back to its original head supporting position.

The frame 6 serves a dual function in that it not only provides structural rigidity for the side pads 4, but the horizontal section 9 of frame 6 also serves as the pivot shaft for pivotal movement of head pad 5.

While the drawings illustrate the head pad being pivotable between the head supporting position and the release position, it is contemplated that the head pad can be mounted for other types of movement between the body supporting and release positions. While the invention has particular application for use as a seat in a fire truck to contain a SCBA cylinder, it is contemplated that the seat can also be used in other applications where it is desired to store a cylinder tank or other object within a cavity in a seat back.

Various modes of carrying out the invention are contemplated as being within the scope of the following claims particularly pointing out and distinctly claiming the subject matter which is regarded as the invention.

We claim:

1. A seat construction for an emergency conveyance, comprising a seat base, a back extending upwardly from the base, said back comprising a pair of elongated side members spaced apart to provide a forwardly facing cavity therebetween, head support means connecting the upper ends of said side members, and a life support unit disposed in said cavity, said head support means being mounted for movement between a head supporting position where said head support means restricts removal of said from said cavity and a release position where said head support means will not interfere with removal of said unit from said cavity.

2. The seat construction of claim 1, and including biasing means for biasing said head support means to said head supporting position.

3. The seat construction of claim 1, and including enclosure means extending rearwardly from said back and aligned with said cavity to prevent rear displacement of said unit from said cavity.

4. The seat construction of claim 3, wherein said enclosure means comprises an enclosure having a generally U-shaped horizontal cross section.

5. The seat construction of claim 1, wherein said head support means is mounted for pivotal movement between said head supporting position and said release position.

6. The seat construction of claim 5, wherein said head support means is pivotable through an arc greater than 90°.

7. The seat construction of claim 1, wherein said back includes an inverted generally U-shaped frame including a pair of generally vertical sections and a horizontal section connecting the upper ends of said vertical section, said vertical sections being integrally connected to said side members of the back, said head support means being mounted for pivotal movement on said horizontal section from said body supporting position to said release position.

8. The seat construction of claim 7, and including biasing means for biasing said head member to the head supporting position.

9. The seat construction of claim 7, wherein said horizontal section is generally circular in cross section.

10. The seat construction of claim 8, and including stop means connected to said frame for retaining said head member in said head supporting position.

11. In combination, a seat base, a seat back extending upwardly from said base, said back comprising a pair of elongated spaced side members and also including a head member, the side members and said head member defining a forward facing elongated cavity, a breathing apparatus disposed in said cavity, said head member being mounted for a range of movement between a body supporting position where said head support member restricts removal of the breathing apparatus from said cavity and a release position where said head member will not interfere with removal of said breathing apparatus from said cavity, biasing means for biasing said head member to said body supporting position, said biasing means being operable to return the head member to the head supporting position after removal of the breathing apparatus from the cavity.

12. The seat construction of claim 11, and including enclosure means extending rearwardly from said back and aligned with said cavity.

13. The seat construction of claim 11, wherein said head member is mounted for pivotal movement between said body supported position and said release position.

14. An emergency conveyance seat, comprising a base, and a back extending upwardly from said base, said back having a pair of elongated side pads and having a head pad located adjacent the upper ends of said side pads, said side pads defining a vertically elongated cavity in said back, an enclosure connected to said side pads for enclosing the rear of said cavity, said cavity adapted to receive a cylinder of a self-contained breathing apparatus, mounting means for mounting the head pad for pivotal movement between a head supporting position where the head pade restricts removal of the cylinder from said cavity and a release position where said head pad will not interfere with removal of said cylinder from said cavity, and biasing means for biasing the head pad to the head supporting position, said biasing means being operable throughout the full range of movement of said head pad to return the head pad to the head supporting position after removal of the cylinder from the cavity.

15. The seat construction of claim 14, wherein said back includes a frame having a pair of generally vertical sections and a horizontal section connecting the upper ends of said vertical sections, said side pads being connected to the corresponding vertical sections of the frame, said head pad being mounted for pivotal movement on said horizontal section.

16. The seat construction of claim 14, and including connecting means for removably connecting said cylinder to said enclosure.

17. The seat construction of claim 14, wherein said biasing means interconnects said enclosure and said head pad.

* * * * *

UNITED STATES PATENT AND TRADEMARK OFFICE
CERTIFICATE OF CORRECTION

PATENT NO.   : 5,213,392

DATED        : May 25, 1993

INVENTOR(S)  : JOHN M. BOSTROM ET AL

It is certified that error appears in the above-identified patent and that said Letters Patent is hereby corrected as shown below:

Col. 4, Line 15, CLAIM 1, Before "back" insert --seat--; Col. 4, Line 23, CLAIM 1, After "said, first occurrence, insert --unit--;

Signed and Sealed this

Sixteenth Day of May, 1995

Attest:

BRUCE LEHMAN

Attesting Officer          Commissioner of Patents and Trademarks